(12) United States Patent
Kim et al.

(10) Patent No.: US 9,481,227 B2
(45) Date of Patent: Nov. 1, 2016

(54) AIR CONDITIONING APPARATUS FOR VEHICLES

(71) Applicants: Hyundai Motor Company, Seoul (KR); Kia Motors Corporation, Seoul (KR); Halla Visteon Climate Control Corp., Daejeon (KR)

(72) Inventors: Myung Hoe Kim, Seoul (KR); Jae Min Yang, Suwon-si (KR); Seung Wook Kim, Suwon-si (KR); Jong Heon Lee, Hwaseong-si (KR); Hyung Joo Kim, Daejeon (KR); Sang Chul Byon, Daejeon (KR)

(73) Assignees: HYUNDAI MOTOR COMPANY, Seoul (KR); KIA MOTORS CORPORATION, Seoul (KR); Halla Visteon Climate Control Corp., Deajeon (KR)

( * ) Notice: Subject to any disclaimer, the term of this patent is extended or adjusted under 35 U.S.C. 154(b) by 631 days.

(21) Appl. No.: 13/913,261

(22) Filed: Jun. 7, 2013

(65) Prior Publication Data
US 2014/0134937 A1 May 15, 2014

(30) Foreign Application Priority Data
Nov. 12, 2012 (KR) .................. 10-2012-0127636

(51) Int. Cl.
*B60H 1/00* (2006.01)
*B60S 1/54* (2006.01)
*B60H 1/24* (2006.01)
*B60S 1/02* (2006.01)

(52) U.S. Cl.
CPC ...... *B60H 1/00821* (2013.01); *B60H 1/00035* (2013.01); *B60H 1/00692* (2013.01)

(58) Field of Classification Search
CPC .......... B60H 1/00035; B60H 1/00692; B60H 1/00821
USPC ......................................... 454/127, 143, 145
See application file for complete search history.

(56) References Cited

U.S. PATENT DOCUMENTS

| 6,048,263 A | 4/2000 | Uchida et al. |
| 6,261,172 B1 | 7/2001 | Shibata |

(Continued)

FOREIGN PATENT DOCUMENTS

| KR | 10-2001-0108763 A | 12/2001 |
| KR | 10-2009-0069614 A | 7/2009 |

(Continued)

OTHER PUBLICATIONS

Korean Office Action issued in Korean Application No. 10-2012-0127636 dated Nov. 20, 2013, 4 pgs.

*Primary Examiner* — Steven B McAllister
*Assistant Examiner* — Reginald McNeill, II
(74) *Attorney, Agent, or Firm* — McDermott Will & Emery LLP

(57) ABSTRACT

An air conditioning apparatus includes an air conditioning housing and a mode door. The air conditioning housing has a discharge chamber through which conditioned air is discharged out of the air conditioning housing. The discharge chamber includes a defrost vent, a main vent, floor vents and a rear seat vent. The floor vents are formed on opposite sides of a rear portion of the air conditioning housing. The rear seat vent is formed between the floor vents. The mode door has a front opening hole which is formed in a front portion of the mode door, a pair of main opening holes which are formed in a rear portion of the mode door at positions spaced apart from each other, and a rear-end opening hole which is formed behind a first portion provided between the main opening holes.

13 Claims, 17 Drawing Sheets

(56) References Cited

U.S. PATENT DOCUMENTS

2011/0021130 A1* 1/2011 Kim .................. B60H 1/00028
 454/121
2012/0057972 A1* 3/2012 Kim .................. B60H 1/00507
 415/204

FOREIGN PATENT DOCUMENTS

| KR | 10-2010-0086258 A | | 7/2010 |
| KR | 20100086258 A | * | 7/2010 |
| KR | 10-2012-0018418 A | | 3/2012 |

* cited by examiner

AIR CONDITIONING APPARATUS FOR VEHICLES

CROSS-REFERENCE TO RELATED APPLICATION

This application claims under 35 U.S.C. §119(a) the benefit of Korean Patent Application No. 10-2012-0127636 filed on Nov. 12, 2012, the entire contents of which is incorporated herein by reference.

BACKGROUND OF THE DISCLOSURE

1. Field of the Disclosure

The present disclosure relates to an air conditioning apparatus for vehicles which can embody seven kinds of air-conditioning modes using only a single mode door.

2. Description of the Related Art

Generally, air conditioning apparatuses for vehicles are parts which are installed in vehicles with an intent to cool or heat passenger compartments in the summer or winter, or to remove frost which is easily formed on windshields in the rain or in the winter so as to secure clear front and rear views for the driver. Such an air conditioning apparatus typically has both a heating function and a cooling function, and thus is able to cool or heat the passenger compartment of a vehicle or circulate air in the passenger compartment in such a way that outdoor or indoor air is selectively drawn into the air conditioning apparatus and then blown into the passenger compartment after it is heated or cooled.

According to the independent relationship among a blower unit, an evaporator unit and a heater core unit, air conditioning apparatuses are classified into a three piece type apparatus in which the above three units are provided independently from each other, a semi-center type apparatus in which the evaporator unit and the heater core unit are installed in an air conditioning casing and the blower unit is separately provided, and a center mounting type apparatus in which all three units are installed in the air conditioning casing. Recently, a left and right side independent type air conditioning apparatus was proposed, in which air having different temperatures is supplied to a driver seat and a passenger seat in the passenger compartment of a vehicle so as to individually cool or heat the driver seat and the passenger seat as necessary.

Air conditioning modes which can be embodied in vehicles are generally classified into seven kinds of modes according to the direction of air blown into the passenger compartment. These includes a main mode, a floor mode, a defrost mode, a main-floor mode, a main-defrost mode, a floor-defrost mode and a main-floor-defrost mode.

A representative example of a conventional air conditioning apparatus was proposed in Korean Patent Laid-open Publication No. 10-2012-0018418 A. In this conventional air conditioning apparatus, a mode door is formed of a single thin film member which includes a first door part that opens and closes at least two vents, and a second door part that opens and closes one vent and is connected to the first door part by a bridge part. A receiving part is formed in an air conditioning casing. The receiving part extends a predetermined length along a direction in which the thin film member slides. An end of the thin film member is received in the receiving part. In this conventional air conditioning apparatus, it is not required to increase the overall size of the apparatus despite taking the operation of the thin film member into account. Further, the single mode door can open and close several vents. Particularly, the single thin film member having an improved structure is used as the mode door. Hence, the overall structure of the mode door is simple so that the number of elements, the weight and the production cost can be reduced, while the durability of the apparatus is enhanced. In addition, the use of the single thin film member makes it possible to prevent occurrences of odor attributable to mold, and the single thin film member can be reused (recycled).

However, the mode door of this conventional technique is able to control only five kinds of air conditioning modes and requires a separate door to control the remaining two kinds of conditioning modes.

Given this, an air conditioning apparatus for vehicles is required in which a mode door and an air conditioning housing are designed such that all seven kinds of modes can be embodied by a single mode door.

SUMMARY OF THE DISCLOSURE

Accordingly, the present disclosure has been made keeping in mind the above problems occurring in the prior art, and an object of the present disclosure is to provide an air conditioning apparatus for vehicles which can embody seven kinds of air-conditioning modes using only a single mode door.

In order to accomplish the above object, the present disclosure provides an air conditioning apparatus for a vehicle, including: an air conditioning housing having a discharge chamber through which conditioned air is discharged out of the air conditioning housing, the discharge chamber comprising, in a positional sequence from a front side to a rear side of the vehicle, a defrost vent, a main vent, a floor vent and a rear seat vent, wherein the floor vent comprises a pair of floor vents formed on opposite sides of a rear portion of the air conditioning housing behind the main vent, and the rear seat vent is formed between the pair of floor vents; and a mode door having a panel shape and sliding on the discharge chamber of the air conditioning housing, the mode door including a front opening hole formed in a front portion of the mode door, the front opening hole having a linear shape, a pair of main opening holes formed in a rear portion of the mode door at positions spaced apart from each other by a predetermined distance, and a rear-end opening hole formed behind a first portion provided between the main opening holes.

The mode door may further include a rear opening hole formed in the front portion of the mode door, the rear opening hole having a linear shape and being parallel to the front opening hole.

A separation bar may be provided in the defrost vent. The separation bar may cross the defrost vent in a lateral direction so that the defrost vent is partitioned into a front defrost vent portion and a rear defrost vent portion by the separation bar.

A pair of partitions may be provided in the front defrost vent portion and be spaced apart from each other so that the front defrost vent portion is partitioned into three vents.

Each of the front opening hole and the rear opening hole may be partitioned into three opening holes, wherein lengths of the three opening holes may be equal to lengths of the corresponding three vents of the front defrost vent portion.

Front ends of the floor vents may be collinearly disposed with a front end of the rear seat vent, and a rear end of the rear seat vent may extend farther back than rear ends of the floor vents.

The mode door, the defrost vent, the main vent, the floor vents, the rear seat vent, the front opening hole, the main opening holes and the rear-end opening hole may be rectangular.

A front end of the rear-end opening hole may be collinearly disposed with rear ends of the main opening holes.

The length of the main opening holes may correspond to a length of the floor vent, and the length of the rear-end opening hole may correspond to a length of the rear seat vent.

When the air conditioning apparatus is in a main-floor mode, the front opening hole may be blocked by an outer wall of the air conditioning housing and the rear opening hole may be blocked by the separation bar so that a defrost air-conditioning operation is not conducted, the rear-end opening hole may be matched with the rear seat vent so that a rear seat air-conditioning operation is conducted, the main opening holes may be matched with the main vent so that a center air-conditioning operation is performed, and a lower edge of the mode door that is disposed adjacent to the main opening holes may be disposed over the floor vent so that a floor air-conditioning operation is conducted.

When the air conditioning apparatus is in a main mode, the front opening hole may be blocked by an outer wall of the air conditioning housing and the rear opening hole is blocked by the separation bar so that a defrost air-conditioning operation is not conducted, the rear-end opening hole may be matched with the rear seat vent so that a rear seat air-conditioning operation is conducted, the main opening hole may be matched with the main vent so that a center air-conditioning operation is conducted, and a lower edge of the mode door that is adjacent to the main opening hole may close the floor vent so that a floor air-conditioning operation is not conducted.

When the air conditioning apparatus is in a main-defrost mode, the front opening hole or the rear opening hole may be matched with the defrost vent so that a defrost air-conditioning operation is conducted, the rear-end opening hole may be matched with the rear seat vent so that a rear seat air-conditioning operation is conducted, a main opening hole may be matched with the main vent so that a center air-conditioning operation is conducted, and a lower edge of the mode door that is adjacent to the main opening hole may close the floor vent so that a floor air-conditioning operation is not conducted.

When the air conditioning apparatus is in a main-defrost-floor mode, the front opening hole or the rear opening hole may be matched with the defrost vent so that a defrost air-conditioning operation is conducted, the rear-end opening hole may be matched with the rear seat vent so that a rear seat air-conditioning operation is conducted, and the main opening hole may communicate with both the main vent and the floor vent so that both a center air-conditioning operation and a floor air-conditioning operation are conducted.

When the air conditioning apparatus is in a floor mode, the front opening hole or a front edge of the mode door may be disposed over the defrost vent so that a defrost air-conditioning operation is conducted, the rear seat vent may be blocked by the first portion formed between the rear opening hole and the rear-end opening hole so that a rear seat air-conditioning operation is not conducted, the main vent may be blocked by a second portion formed between the rear opening hole and the main opening holes so that a center air-conditioning operation is not conducted, and the main opening holes may be matched with the floor vent so that a floor air-conditioning operation is conducted.

When the air conditioning apparatus is in a defrost-floor mode, a front edge of the mode door may be disposed over the defrost vent so that a defrost air-conditioning operation is conducted, the rear seat vent may be blocked by the first portion formed between the rear opening hole and the rear-end opening hole so that a rear seat air-conditioning operation is not conducted, the main vent may be blocked by a second portion formed between the rear opening hole and the main opening holes so that a center air-conditioning operation is not conducted, and the main opening holes may be matched with the floor vent so that a floor air-conditioning operation is conducted.

When the air conditioning apparatus is in a defrost mode, a front edge of the mode door may be disposed over the defrost vent so that a defrost air-conditioning operation is conducted, the rear seat vent may be blocked by the first portion formed between the rear opening hole and the rear-end opening hole so that a rear seat air-conditioning operation is not conducted, and the main vent and the floor vent may be blocked by a second portion formed between the rear opening hole and the main opening hole so that a center air-conditioning operation and a floor air-conditioning operation are not conducted.

An air conditioning apparatus for vehicles according to the present disclosure can embody seven kinds of air conditioning modes using only the single mode door. Therefore, the structure of the air conditioning apparatus can be simplified, thus reducing the volume and weight of the apparatus. Moreover, because only a single drive motor may be required, the energy consumption and the production cost can be reduced.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Hereinafter, a preferred embodiment of the present disclosure will be described in detail with reference to the attached drawings.

Figure 1:
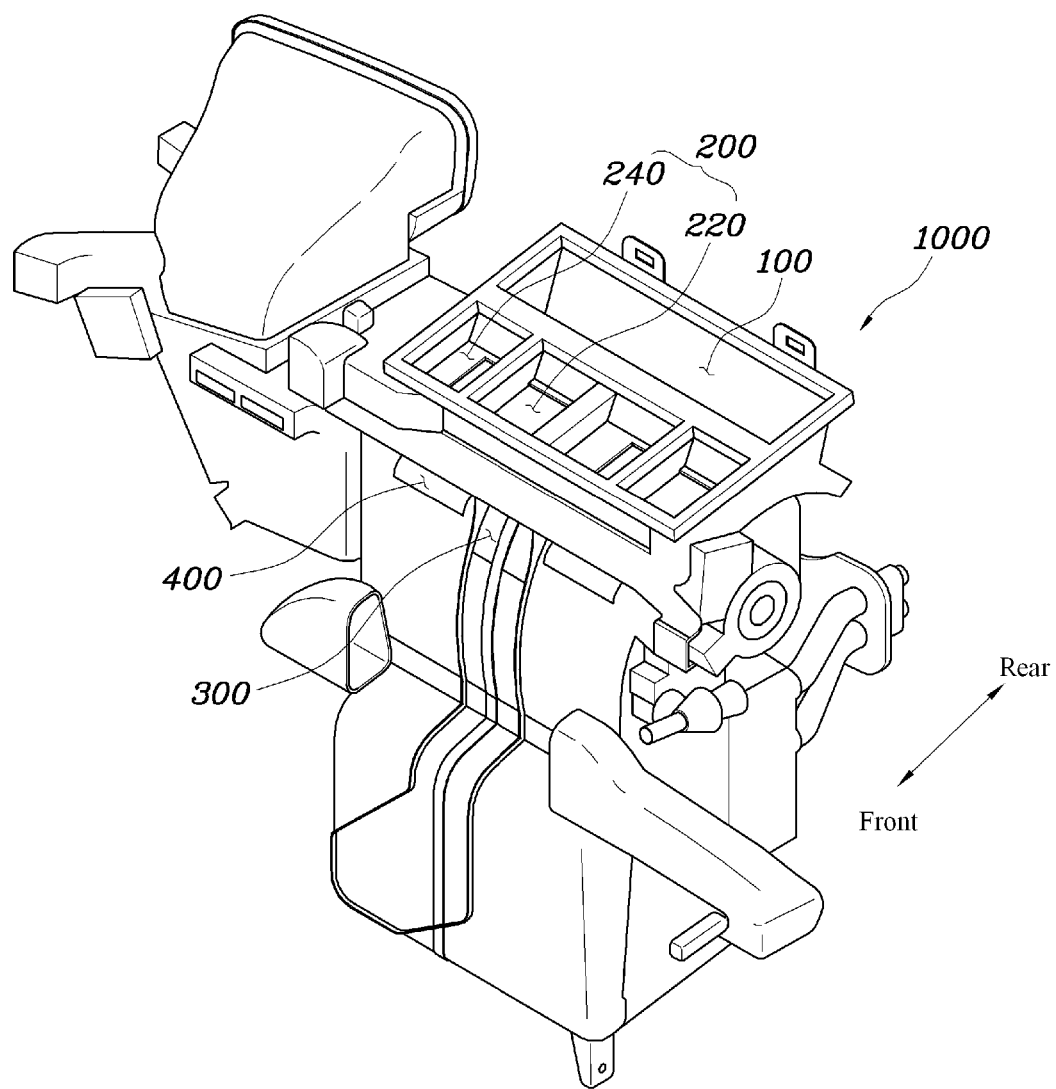
FIG. 1 is a view illustrating an air conditioning housing of an air conditioning apparatus for vehicles according to an exemplary embodiment of the present disclosure.
Figure 2:
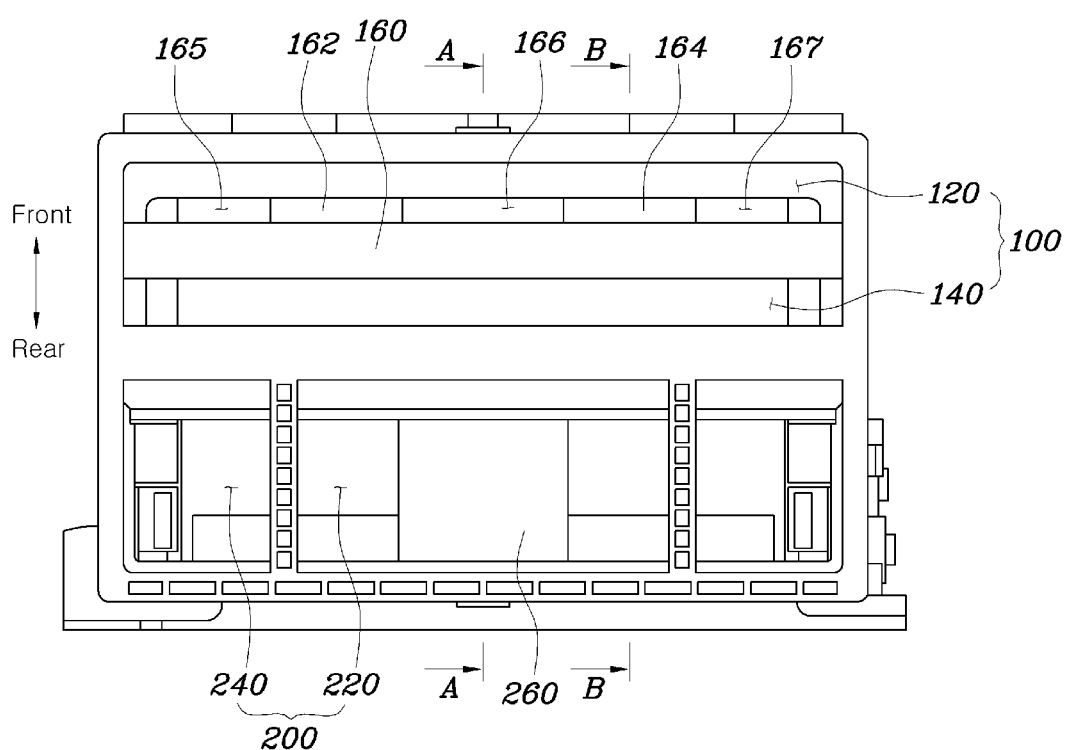
FIG. 2 is a top plan view of the air conditioning housing of FIG. 1.
Figure 3:
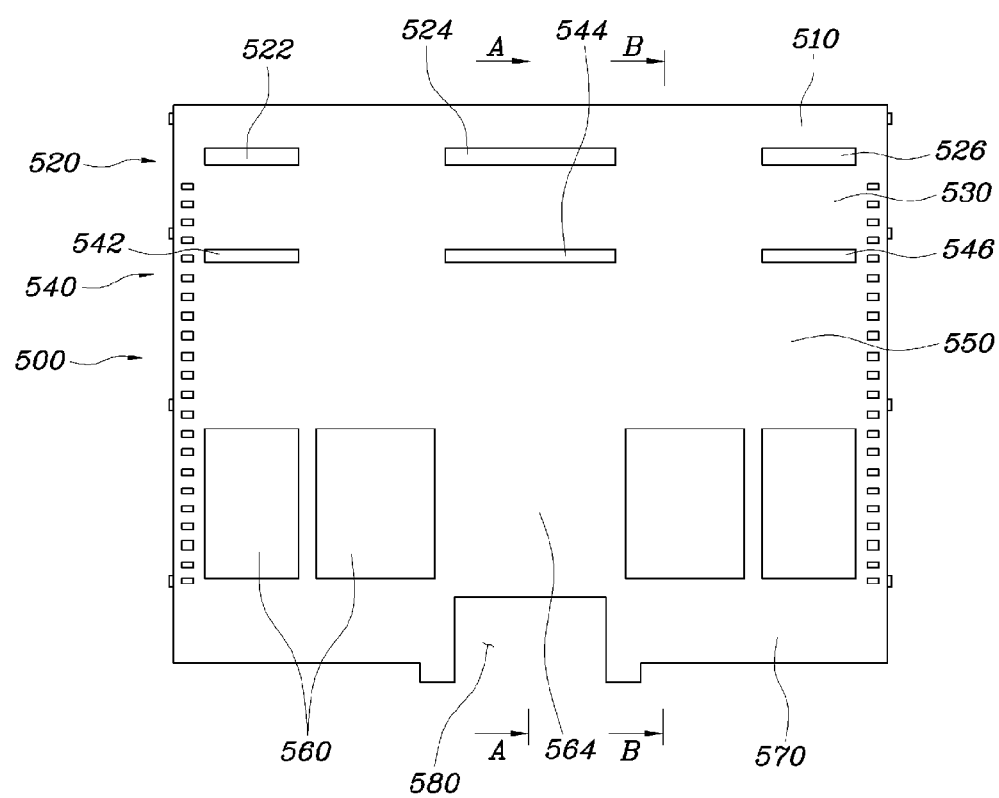
FIG. 3 illustrates a mode door of the air conditioning apparatus according to the exemplary embodiment of the present disclosure.

FIG. 1 is a view illustrating an air conditioning housing 1000 of an air conditioning apparatus for vehicles, according to an exemplary embodiment of the present disclosure. FIG. 2 is a top plan view of the air conditioning housing 1000 of FIG. 1. FIG. 3 illustrates a mode door of the air conditioning apparatus according to the exemplary embodiment of the present disclosure.

As shown in the drawings, the air conditioning apparatus according to the present disclosure includes the air conditioning housing and the mode door which is installed in or disposed outside the air conditioning housing.

The air conditioning housing 1000 has a discharge chamber T through which conditioned air is discharged out of the air conditioning housing 1000. A defrost vent 100, a main vent 200, a floor vent 400 and a rear seat vent 300 are formed, in positional sequence from the front side to the rear side, in the discharge chamber T. Two floor vents 400 are formed in opposite sides of a rear portion of the air conditioning housing 1000 behind the main vent 200. The rear seat vent 300 is formed between the floor vents 400.

The air conditioning housing 1000 houses a blower, a heater core and an evaporator core therein so that indoor or outdoor air can be drawn into the air conditioning housing 1000, conditioned, and then discharged into a passenger compartment of a vehicle by the blower.

Conditioned air flows along the discharge chamber T in the air conditioning housing and comes out of the air conditioning housing through an open vent so that conditioned air can be supplied into the passenger compartment in a required direction. For this purpose, the discharge chamber T has, in a positional sequence from the front side to the rear side, the defrost vent 100, the main vent 200, the floor vent 400 and the rear seat vent 300.

The defrost vent 100 is disposed in the frontmost position of the passenger compartment and blows air onto a windshield to defrost the windshield. The main vent 200 blows air from an instrument panel or a dash panel towards the body of an occupant in the vehicle. Furthermore, the floor vent 400 blows air from a lower portion of a front seat of the vehicle towards the feet of the occupant. The rear seat vent 300 blows air towards a rear seat through a center console. It is a well-known technique that each vent is connected to a corresponding location of the passenger compartment through an appropriate duct or the like, which is provided outside the air conditioning housing 1000, so that air can be supplied to the corresponding location.

The air conditioning housing of the present disclosure is provided to enable embodying all the modes using only a single mode door. In the air conditioning housing 1000, the defrost vent 100, the main vent 200, the floor vent 400 and the rear seat vent 300 are arranged successively from the front side to the rear side, wherein the two floor vents 400 are provided on opposite sides of the rear portion of the air conditioning housing behind the main vent 200, and the rear seat vent 300 is disposed between the floor vents 400.

A separation bar 160 is provided in the defrost vent 100 and oriented in a lateral direction of the air conditioning housing so that the defrost vent 100 is partitioned into a front defrost vent portion 120 and a rear defrost vent portion 140 by the separation bar 160. A pair of partitions 162 and 164 which are spaced apart from each other are provided in the front defrost vent portion 120 so that the front defrost vent portion 120 is partitioned into three vents 165, 166 and 167.

Front ends of the floor vents 400 are collinearly disposed with a front end of the rear seat vent 300. A rear end of the rear seat vent 300 extends farther back than rear ends of the floor vents 400. Partitions are provided in the air conditioning housing to separate the floor vents 400 from the rear seat vent 300, and an independent duct is connected to each vent, whereby mixing of air in the different vents can be prevented.

A partition 260 is disposed in a central portion of the main vent 200 so that the main vent 200 is partitioned into left and right main vents. Each of the left and right main vents is partitioned into left and right portions by another partition. The left portion 240 of the left main vent is connected to a left side relative to a driver seat so that air is discharged towards the left side of the driver seat. The right portion 220 of the left main vent is connected to a right side of the driver seat so that air is discharged towards the central portion of the passenger compartment. Meanwhile, the right main vent is also partitioned into two portions in the same manner as that of the left main vent so that air can be discharged towards left and right sides of a passenger seat.

The mode door 500 has a panel shape and slides on the discharge chamber T of the air conditioning housing 1000. The mode door 500 has a front opening hole 520 and a rear opening hole 540 which are linear and parallel to each other. Two main opening holes 560 are formed on opposite sides of a rear portion of the mode door 500. A rear-end opening hole 580 is formed in the mode door 500 behind a portion 564 formed between the main opening holes 560 which are spaced apart from each other. Furthermore, the rear-end opening hole 580 is formed such that a front end of the rear-end opening hole 580 is collinear with rear ends of the main opening holes 560. Furthermore, each of the front opening hole 520 and the rear opening hole 540 is partitioned respectively into three opening holes 522, 524 and 526 or 542, 544 and 546. A length of each opening hole 522, 524, 526, 542, 544, and 546 is the same as that of the corresponding one of the three vents 165, 166 and 167 of the front defrost vent portion 120.

In other words, as stated above, the separation bar 160 which crosses the defrost vent 100 in the lateral direction is provided in the defrost vent 100 so that the defrost vent 100 can be partitioned into the front defrost vent portion 120 and the rear defrost vent portion 140. The two partitions 162 and 164 which are spaced apart from each other are disposed in the front defrost vent portion 120 so that the front defrost vent portion 120 can be partitioned into the three vents 165, 166 and 167. Furthermore, each of the front opening hole 520 and the rear opening hole 540 is partitioned respectively into the three opening holes 522, 524 and 526 or 542, 544 and 546. The length of each opening hole 522, 524, 526, 542, 544, and 546 is the same as that of the corresponding one of the three vents 165, 166 and 167 of the front defrost vent portion 120.

Further, a length of the main opening hole 560 corresponds to that of the floor vent 400. A length of the rear-end opening hole 580 corresponds to that of the rear seat vent 300. Thus, when the mode door 500 slides to a predetermined position, the main opening hole 560 overlaps the floor vent 400 so that a floor air-conditioning operation can be embodied. When the mode door 500 slides to a predetermined position, the rear-end opening hole 580 overlaps the rear seat vent 300 so that a rear seat air-conditioning operation can be embodied.

In this exemplary embodiment, the mode door 500, the vents 100, 200, 300 and 400 and the opening holes 520, 540, 560 and 580 have, for example, rectangular shapes so that when each one overlaps the corresponding one, they can be smoothly and precisely matched with each other. The mode door 500 is moved by a drive unit including gears or the like to embody each mode.

Hereinafter, the exemplary embodiment of each mode will be described with reference to the drawings. FIGS. 4, 6, 8, 10, 12, 14 and 16 are sectional views taken along line A-A when the air conditioning housing of FIG. 2 and the mode door 500 are coupled and overlap each other. FIGS. 5, 7, 9, 11, 13, 15 and 17 are sectional views taken along line B-B when the air conditioning housing of FIG. 2 and the mode door 500 are coupled to each other. Line A-A and line B-B are illustrated in each of FIGS. 2 and 3, wherein when the air conditioning housing 1000 of FIG. 2 and the mode door 500 of FIG. 3 are coupled such that they overlap each other, line A-A and line B-B of FIG. 2 respectively overlap those of FIG. 3. FIGS. 4 through 17 illustrate different kinds of modes when the air conditioning housing 1000 of FIG. 2 is coupled to the mode door 500 of FIG. 3.

Figure 4:
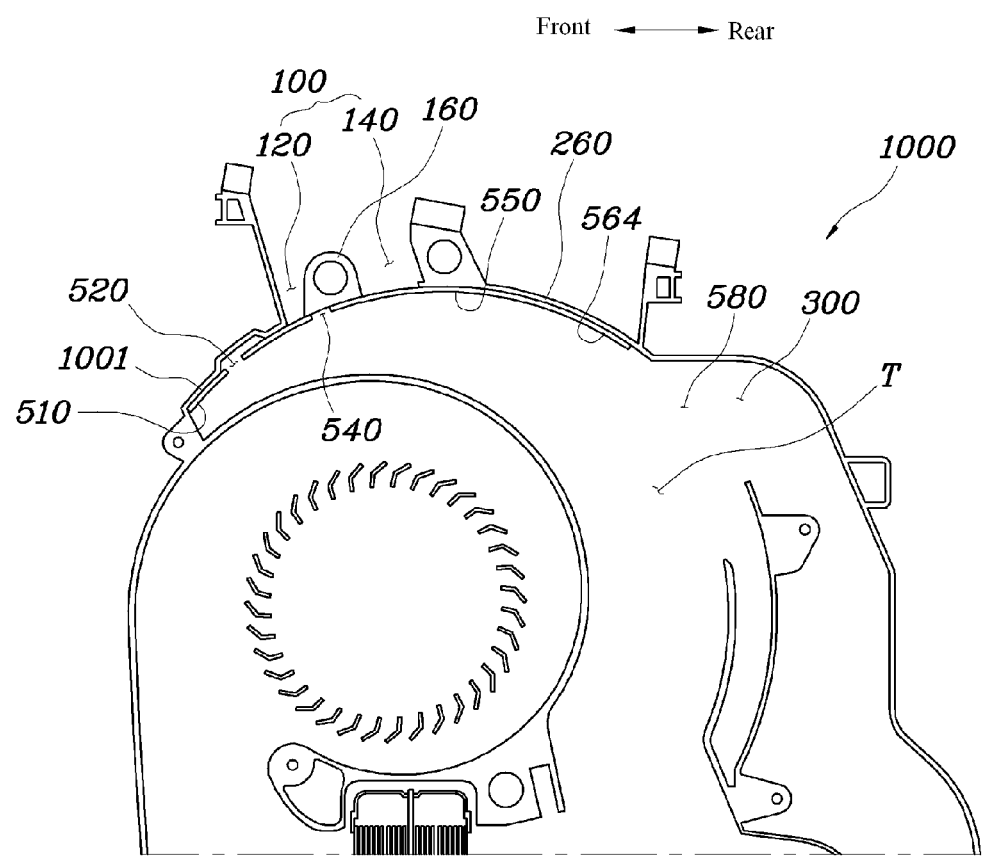
FIGS. 4 and 5 are views illustrating a main-floor mode of the air conditioning apparatus according to the exemplary embodiment of the present disclosure.
Figure 5:
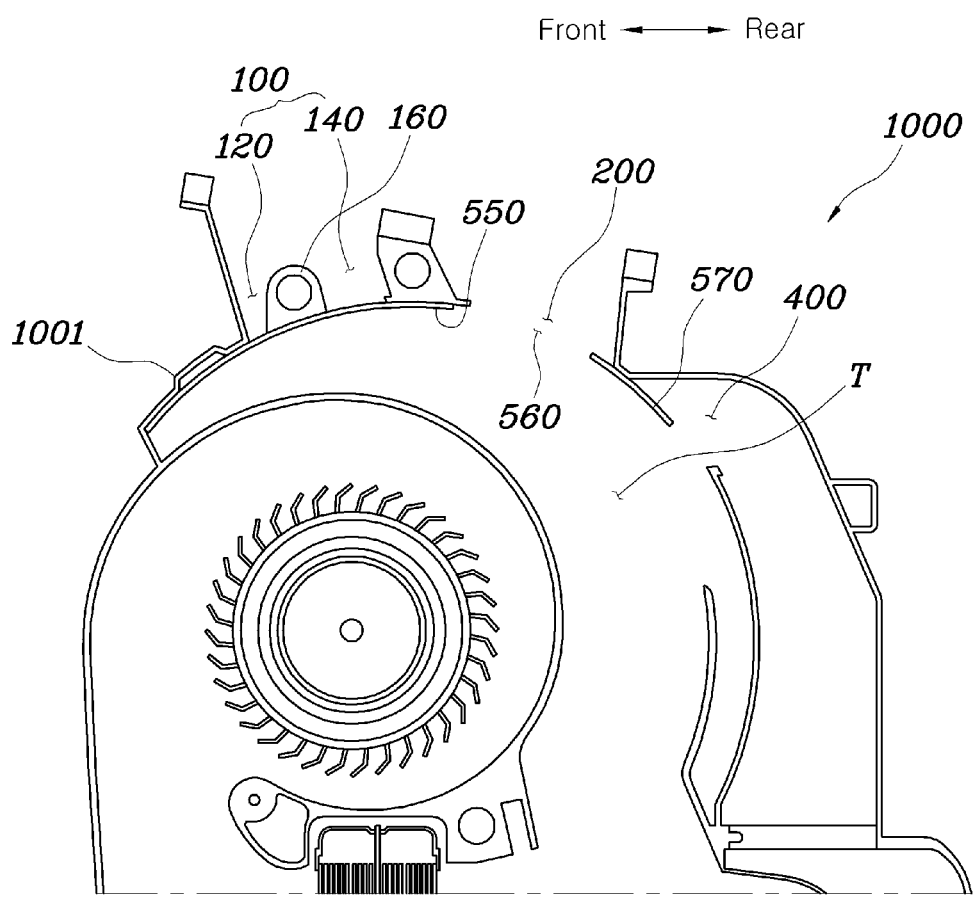

FIGS. 4 and 5 are views illustrating a main-floor mode of the air conditioning apparatus according to the exemplary embodiment of the present disclosure.

In the main-floor mode of the air conditioning apparatus, the mode door 500 is moved to a frontmost position. In this case, the front opening hole 520 of the mode door 500 is blocked by an outer wall 1001 of the air conditioning housing 1000, and the rear opening hole 540 is blocked by the separation bar 160, whereby both the front defrost vent portion 120 and the rear defrost vent portion 140 are closed. Therefore, a defrost air-conditioning operation is not conducted. On the other hand, the rear-end opening hole 580 is matched with the rear seat vent 300 so that the rear seat air-conditioning operation is conducted, and the main opening hole 560 is matched with the main vent 200 so that a center air-conditioning operation is performed. A lower edge 570 of the mode door 500 that is adjacent to the main opening holes 560 is disposed over the floor vent 400 so that air can be supplied into the floor vent 400 through the partially open space, thus conducting the floor air-conditioning operation.

Figure 6:
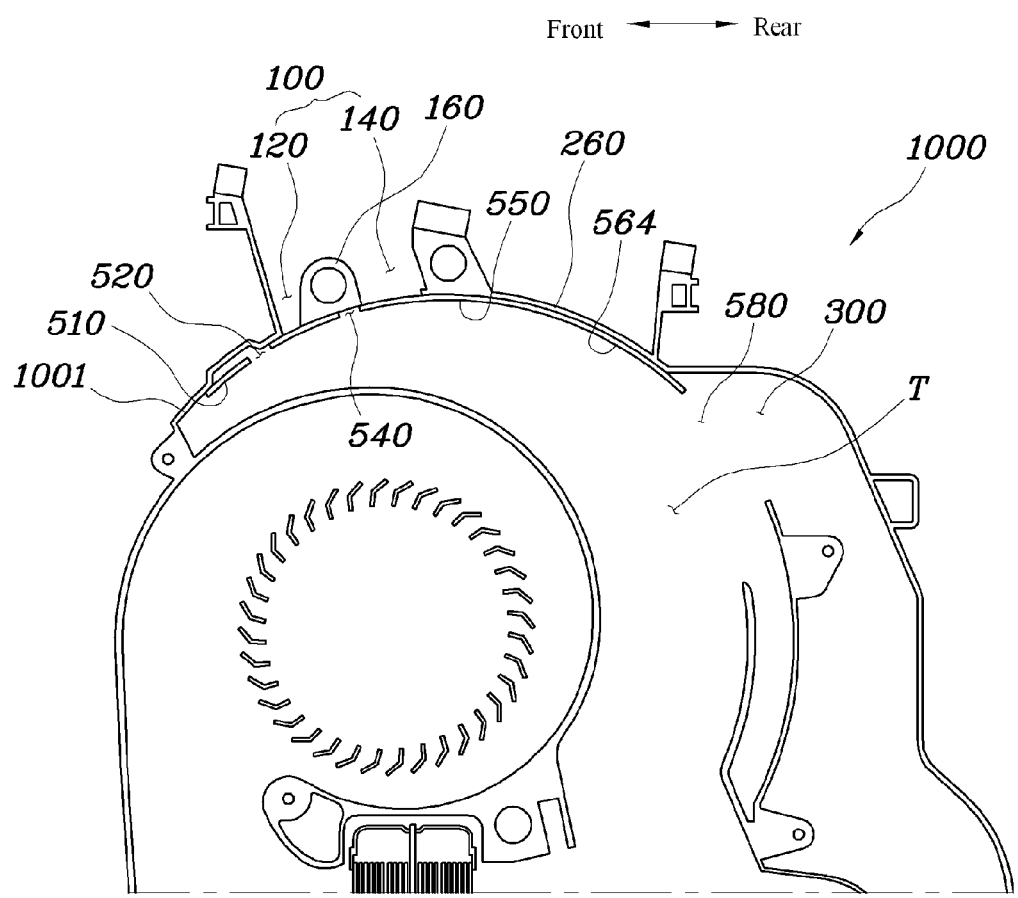
FIGS. 6 and 7 are views illustrating a main mode of the air conditioning apparatus according to the exemplary embodiment of the present disclosure.
Figure 7:
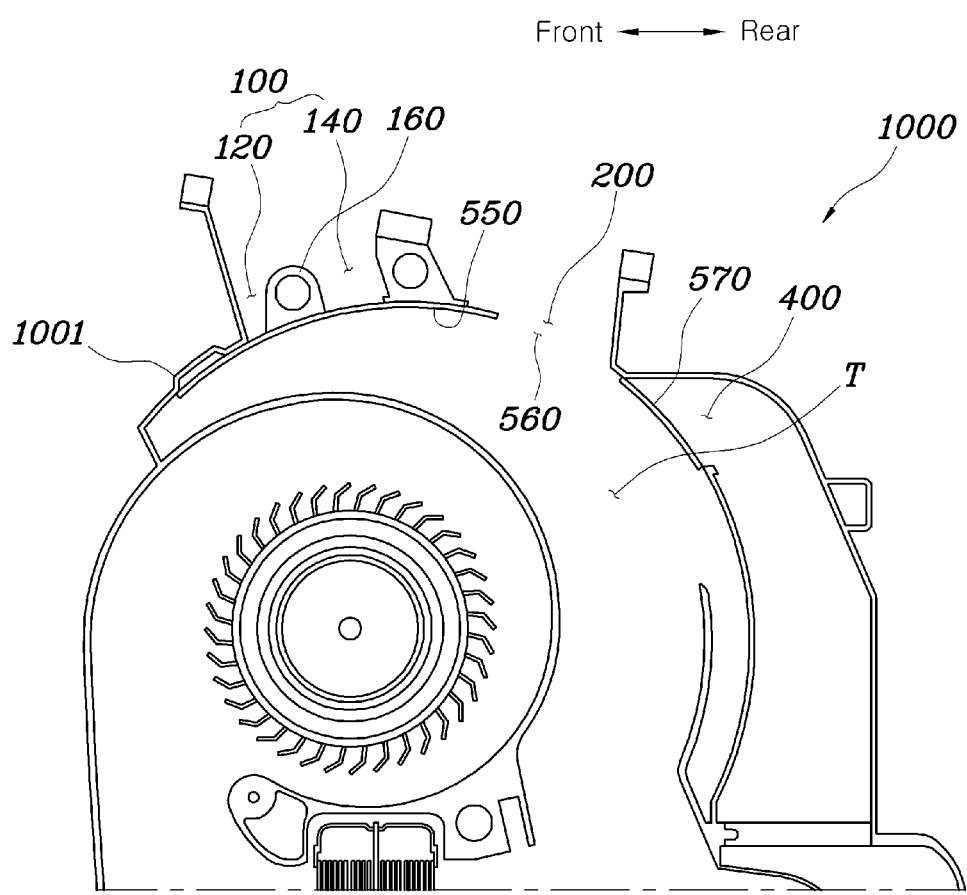

FIGS. 6 and 7 are views illustrating a main mode of the air conditioning apparatus according to the exemplary embodiment of the present disclosure. In this case, the mode door 500 slides rearwards to a predetermined position from when it is in the main-floor mode.

In the main mode of the air conditioning apparatus, the front opening hole 520 is blocked by the outer wall 1001 of the air conditioning housing 1000, and the rear opening hole 540 is blocked by the separation bar 160, whereby both the front defrost vent portion 120 and the rear defrost vent portion 140 are closed. Thereby, the defrost air-conditioning operation is not conducted. Meanwhile, the rear-end opening hole 580 is matched with the rear seat vent 300 so that the rear seat air-conditioning operation is conducted. In addition, the main opening hole 560 is matched with the main vent 200 so that a center air-conditioning operation is conducted. On the other hand, the lower edge 570 of the mode door 500 that is adjacent to the main opening hole 560 completely closes the floor vent 400 so that the floor air-conditioning operation is not conducted.

Figure 8:
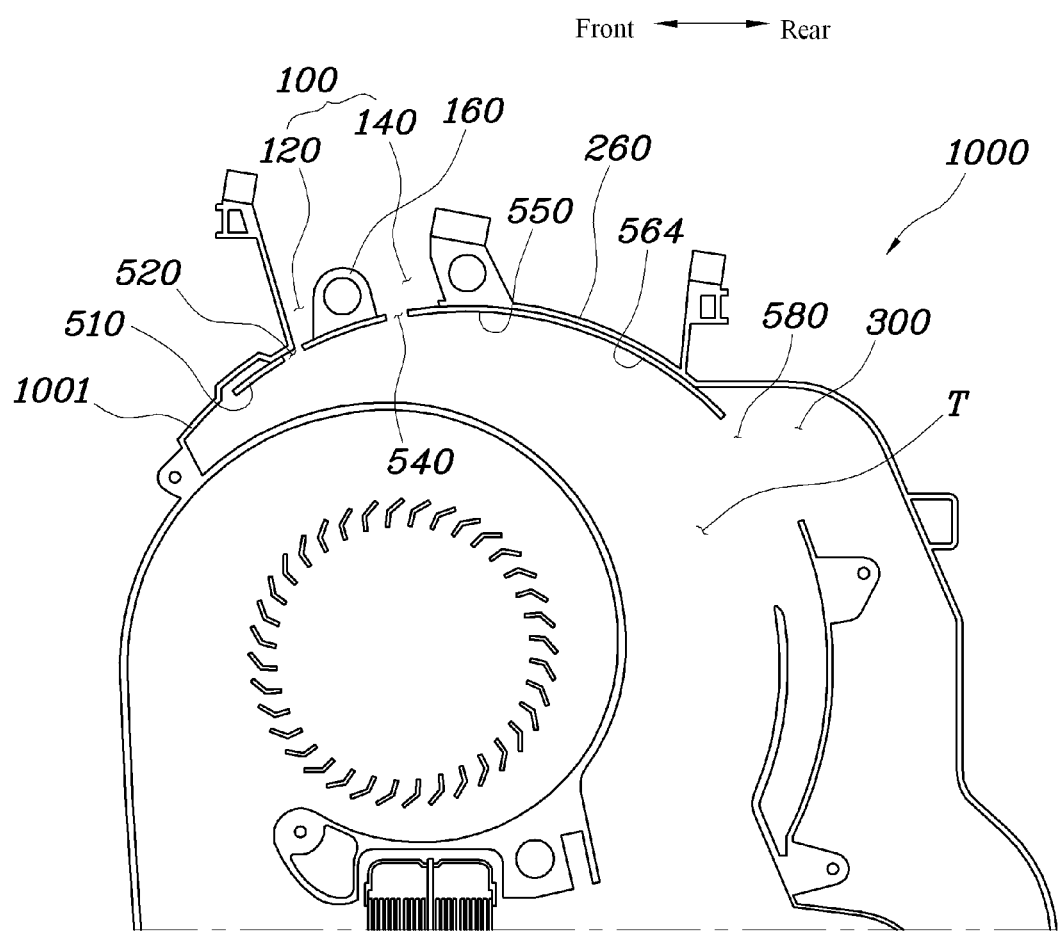
FIGS. 8 and 9 are views illustrating a main-defrost mode of the air conditioning apparatus according to the exemplary embodiment of the present disclosure.
Figure 9:
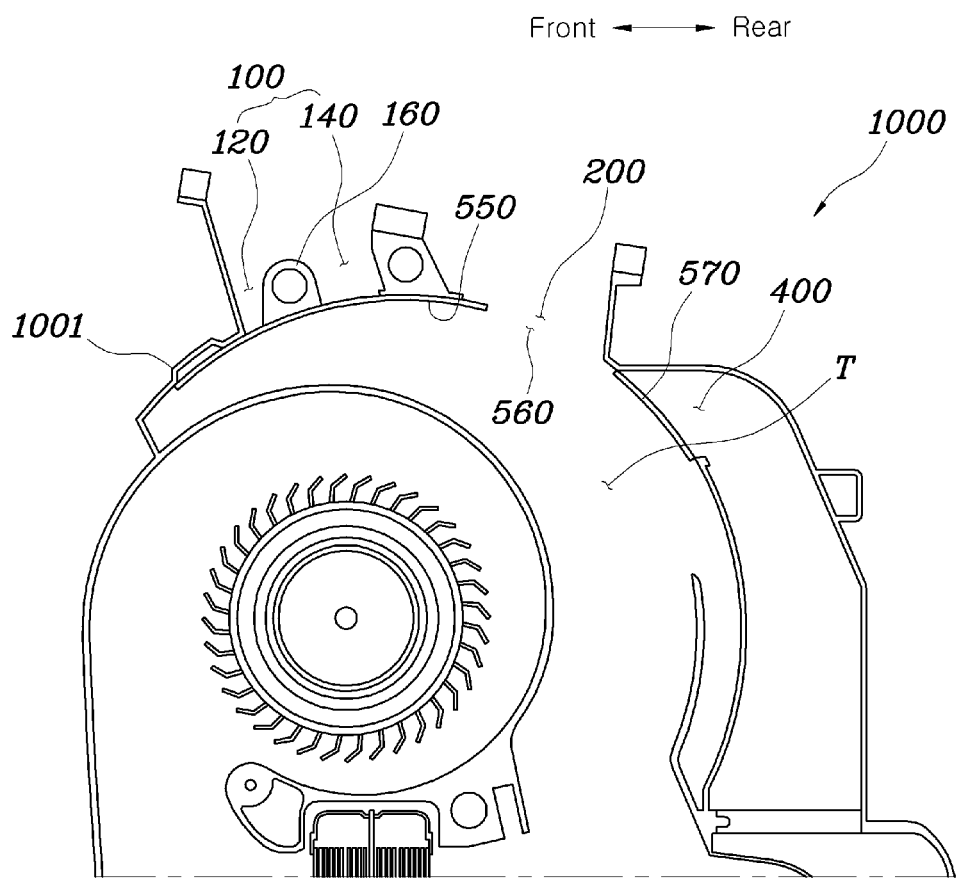

FIGS. 8 and 9 are views illustrating a main-defrost mode of the air conditioning apparatus according to the exemplary embodiment of the present disclosure. In this case, the mode door 500 slides rearwards to a predetermined position from when it is in the main mode.

In the main-defrost mode of the air conditioning apparatus, the front opening hole 520 or the rear opening hole 540 is matched with the defrost vent 100 so that the defrost air-conditioning operation is conducted. In the exemplary embodiment shown in the drawings, the rear opening hole 540 communicates with the rear defrost vent portion 140 so that air is supplied into the rear defrost vent portion 140. Furthermore, the rear-end opening hole 580 is matched with the rear seat vent 300 so that the rear seat air-conditioning operation is conducted. In addition, the main opening hole 560 is matched with the main vent 200. Thus, the center air-conditioning operation is conducted. The lower edge 570 of the mode door 500 that is adjacent to the main opening hole 560 closes the floor vent 400, thus interrupting the floor air-conditioning operation.

Figure 10:
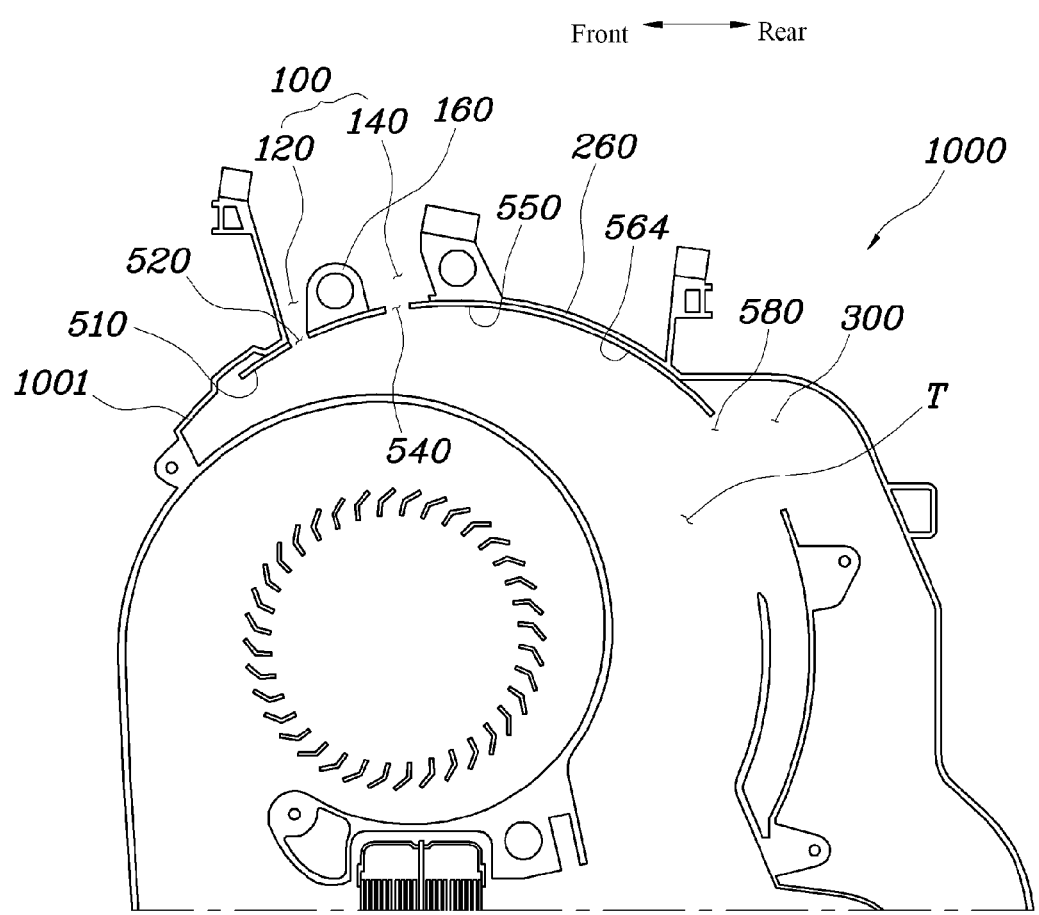
FIGS. 10 and 11 are views illustrating a main-defrost-floor mode of the air conditioning apparatus according to the exemplary embodiment of the present disclosure.
Figure 11:
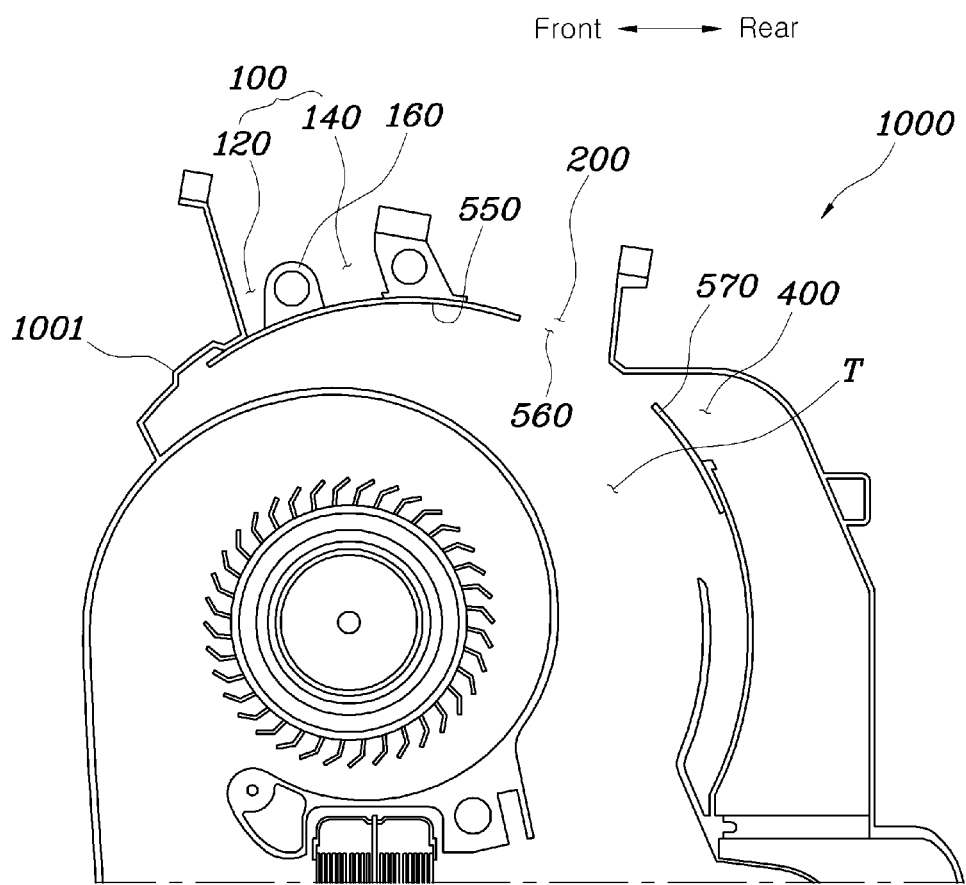

FIGS. 10 and 11 are views illustrating a main-defrost-floor mode of the air conditioning apparatus according to the exemplary embodiment of the present disclosure. In this case, the mode door 500 slides rearwards to a predetermined position from when it is in the main-defrost mode.

In the main-defrost-floor mode, the front opening hole 520 or the rear opening hole 540 is matched with the defrost vent 100 so that the defrost air-conditioning operation is conducted. In the exemplary embodiment shown in the drawings, the front opening hole 520 is matched with the front defrost vent portion 120, and the rear opening hole 540 communicates with the rear defrost vent portion 140 so that the defrost air-conditioning operation is conducted. Furthermore, the rear-end opening hole 580 is matched with the rear seat vent 300 so that the rear seat air-conditioning operation is conducted. In addition, the main opening hole 560 communicates with both the main vent 200 and the floor vent 400, whereby both the center air-conditioning operation and the floor air-conditioning operation are conducted.

Figure 12:
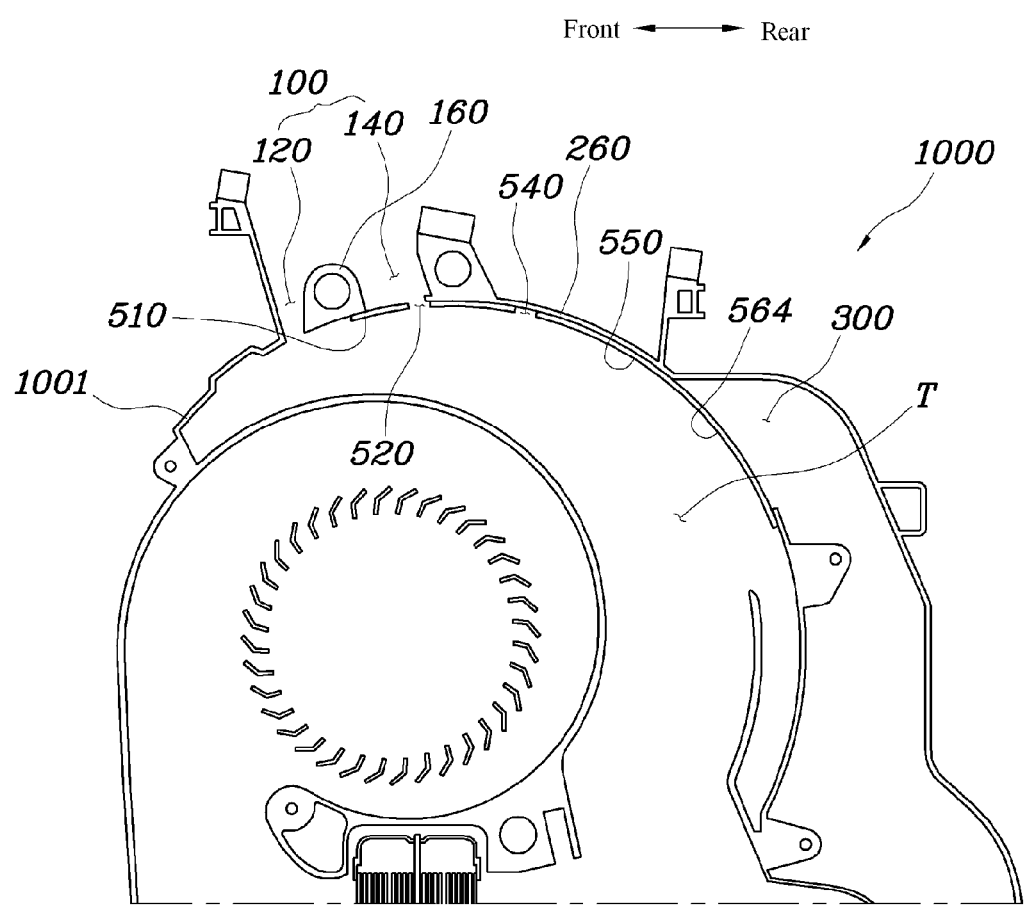
FIGS. 12 and 13 are views illustrating a floor mode of the air conditioning apparatus according to the exemplary embodiment of the present disclosure.
Figure 13:
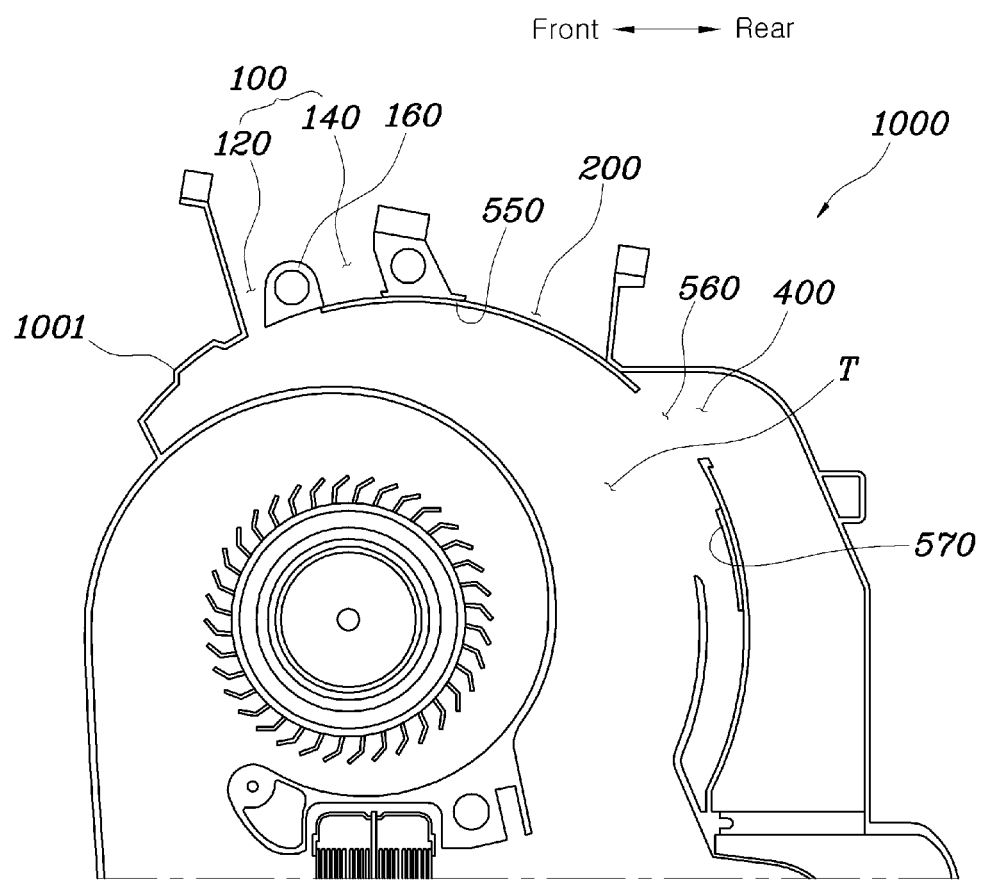

FIGS. 12 and 13 are views illustrating a floor mode of the air conditioning apparatus according to the exemplary embodiment of the present disclosure. In this case, the mode door 500 slides rearwards to a predetermined position from when it is in the main-defrost-floor mode.

In the floor mode, the front opening hole 520 or a front edge 510 of the mode door 500 is disposed over the defrost vent 100 so that the defrost air-conditioning operation is conducted. This enables conducting a slight defrost air-conditioning operation to defrost the windshield even while the air conditioning apparatus is in the floor mode. In the exemplary embodiment shown in the drawings, the front opening hole 520 is matched with the rear defrost vent portion 140, and the rear opening hole 540 is blocked so that the defrost air-conditioning operation is conducted. Furthermore, the rear seat vent 300 is blocked by the portion 564 formed between the rear opening hole 540 and the rear-end opening hole 580, whereby the rear seat air-conditioning operation is not conducted. In addition, the main vent 200 is blocked by the portion 550 formed between the rear opening hole 540 and the main opening holes 560 so that the center air-conditioning operation is not conducted. The main opening holes 560 are matched with the floor vent 400 so that the floor air-conditioning operation is conducted.

Figure 14:
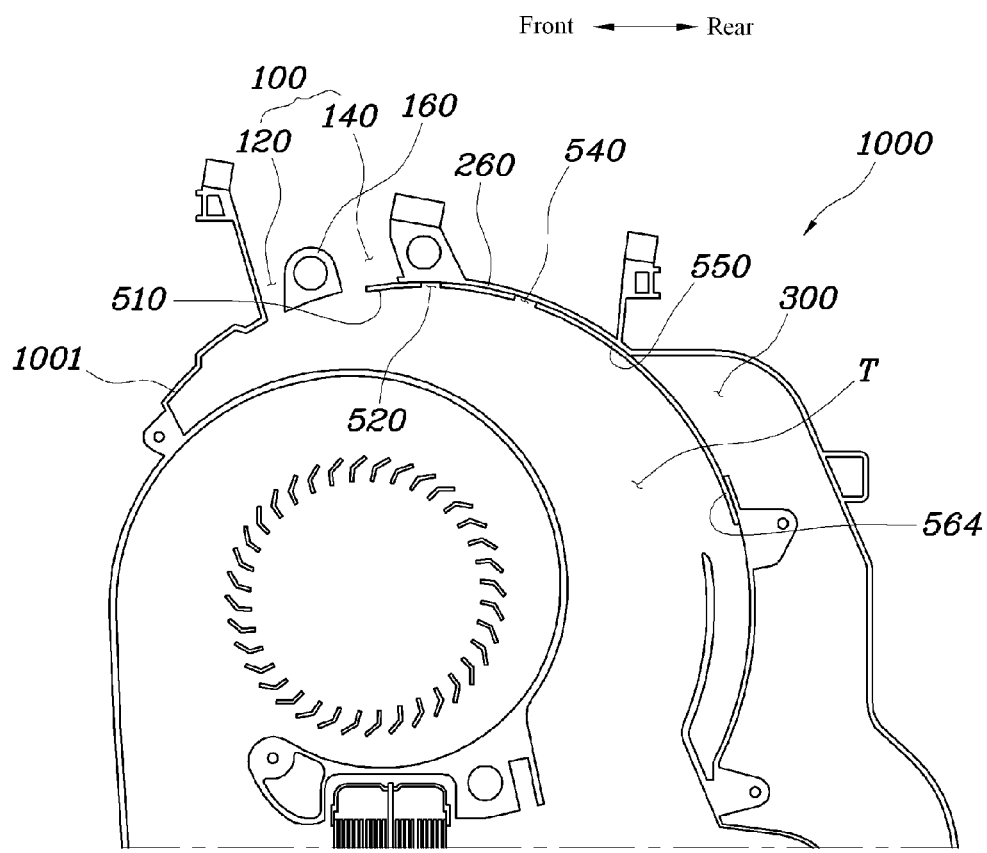
FIGS. 14 and 15 are views illustrating a defrost-floor mode of the air conditioning apparatus according to the exemplary embodiment of the present disclosure.
Figure 15:
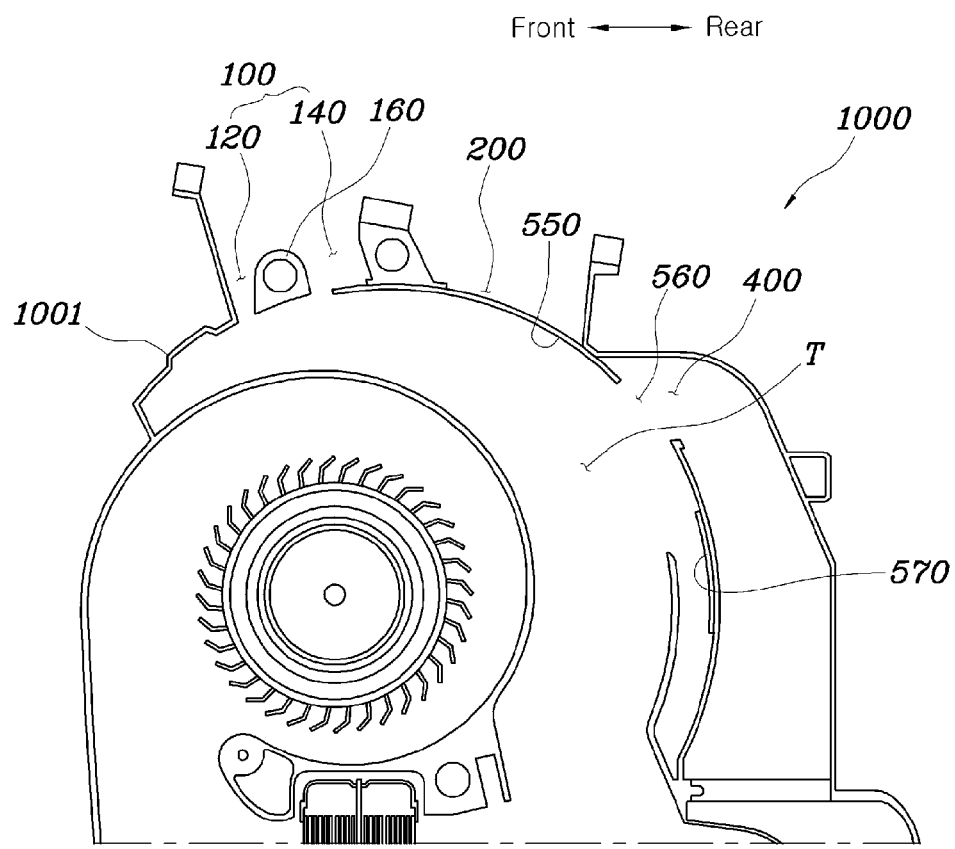

FIGS. 14 and 15 are views illustrating a defrost-floor mode of the air conditioning apparatus according to the exemplary embodiment of the present disclosure. In this case, the mode door 500 slides rearwards to a predetermined position from when it is in the floor mode.

In the defrost-floor mode, the front edge 510 of the mode door 500 is disposed over the defrost vent 100 so that the defrost air-conditioning operation is conducted. The rear seat vent 300 is blocked by the portion 564 formed between the rear opening hole 540 and the rear-end opening hole 580, whereby the rear seat air-conditioning operation is not conducted. In addition, the main vent 200 is blocked by the portion 550 formed between the rear opening hole 540 and the main opening holes 560 so that the center air-conditioning operation is not conducted. The main opening holes 560 are matched with the floor vent 400 so that the floor air-conditioning operation is conducted.

Figure 16:
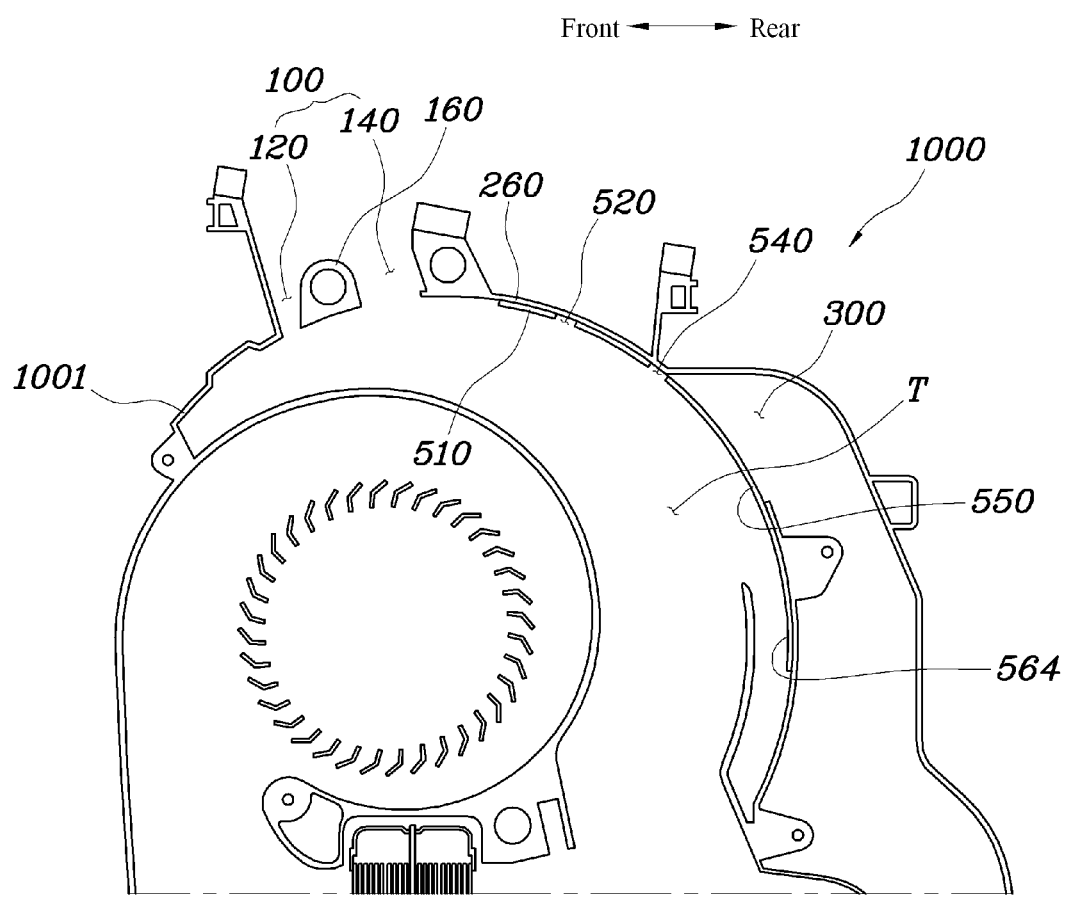
FIGS. 16 and 17 are views illustrating a defrost mode of the air conditioning apparatus according to the exemplary embodiment of the present disclosure.
Figure 17:
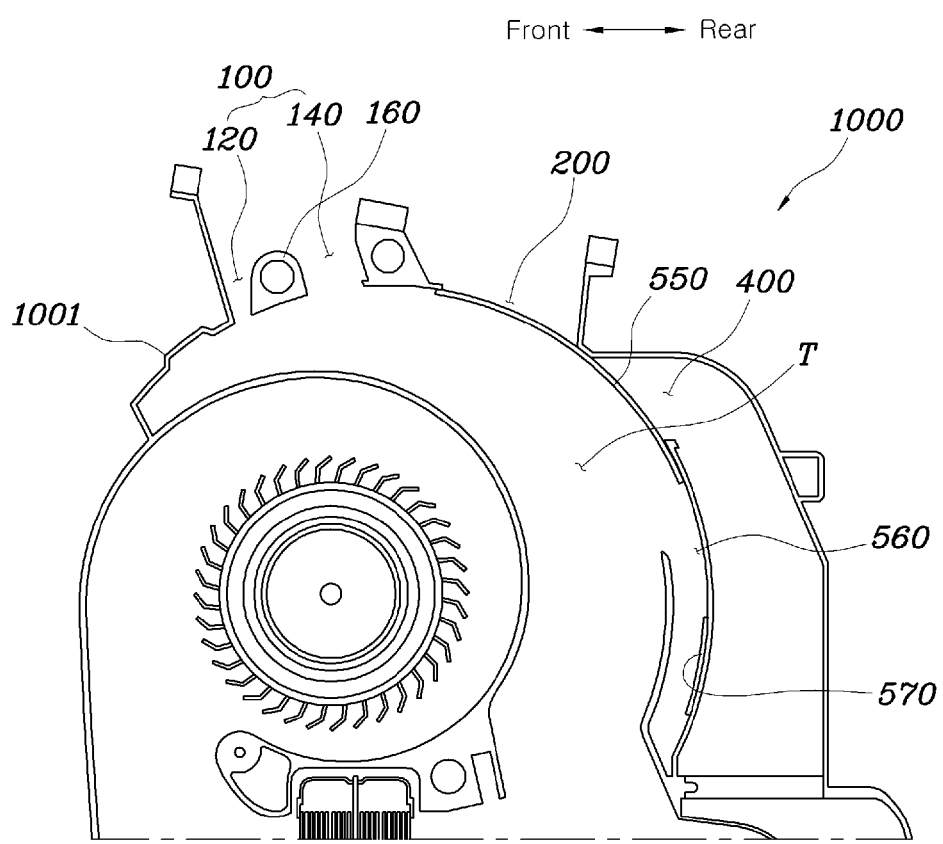

FIGS. 16 and 17 are views illustrating a defrost mode of the air conditioning apparatus according to the exemplary embodiment of the present disclosure. In this case, the mode door 500 slides rearwards to a predetermined position from when it is in the defrost-floor mode.

In the defrost mode, the front edge 510 of the mode door 500 is positioned at the partition 260 so that the defrost air-conditioning operation is conducted. The rear seat vent 300 is blocked by the portion 564 formed between the rear opening hole 540 and the rear-end opening hole 580 so that the rear seat air-conditioning operation is not conducted. The main vent 200 and the floor vent 400 are blocked by the portion 550 formed between the rear opening hole 540 and the main opening hole 560, whereby the center air-conditioning operation and the floor air-conditioning operation are not conducted.

The air conditioning apparatus for vehicles according to the present disclosure having the above-mentioned construction can embody seven kinds of air conditioning modes using only the single mode door. Therefore, the structure of the air conditioning apparatus can be simplified, thus reducing the volume and weight of the apparatus. Moreover, because only a single drive motor is required, the energy consumption and the production cost can be reduced.

Although the preferred embodiment of the present disclosure has been disclosed for illustrative purposes, those having ordinary skill in the art will appreciate that various modifications, additions and substitutions are possible, without departing from the scope and spirit of the disclosure as described in the accompanying claims.

What is claimed is:

1. An air conditioning apparatus for a vehicle, comprising:
   an air conditioning housing having a discharge chamber through which conditioned air is discharged out of the air conditioning housing, the discharge chamber comprising, in a positional sequence from a front side to a rear side of the vehicle, a defrost vent, a main vent, a floor vent and a rear seat vent, wherein the floor vent comprises a pair of floor vents formed on opposite sides of a rear portion of the air conditioning housing behind the main vent, and the rear seat vent is formed between the pair of floor vents; and
   a mode door having a panel shape and sliding on the discharge chamber of the air conditioning housing, the mode door including: a front opening hole formed in a front portion of the mode door, the front opening hole having a linear shape; a pair of main opening holes formed in a rear portion of the mode door at positions spaced apart from each other by a predetermined distance; and a rear-end opening hole formed behind a first portion provided between the main opening holes,
   wherein a separation bar is provided in the defrost vent, the separation bar crossing the defrost vent in a lateral direction so that the defrost vent is partitioned into a front defrost vent portion and a rear defrost vent portion by the separation bar,
   wherein the mode door further includes a rear opening hole formed in the front portion of the mode door, the rear opening hole having a linear shape and being parallel to the front opening hole, and
   wherein when the air conditioning apparatus is in a main-floor mode, the front opening hole is blocked by an outer wall of the air conditioning housing and the rear opening hole is blocked by the separation bar so that a defrost air-conditioning operation is not conducted, the rear-end opening hole is matched with the rear seat vent so that a rear seat air-conditioning operation is conducted, the main opening holes are matched with the main vent so that a center air-conditioning operation is performed, and a lower edge of the mode door that is disposed adjacent to the main opening holes is disposed over the floor vent so that a floor air-conditioning operation is conducted.

2. The air conditioning apparatus as set forth in claim 1, wherein a pair of partitions are provided in the front defrost vent portion and are spaced apart from each other so that the front defrost vent portion is partitioned into three vents.

3. The air conditioning apparatus as set forth in claim 2, wherein each of the front opening hole and the rear opening hole is partitioned into three opening holes, wherein lengths of the three opening holes are equal to lengths of the corresponding three vents of the front defrost vent portion.

4. The air conditioning apparatus as set forth in claim 1, wherein front ends of the floor vents are collinearly disposed with a front end of the rear seat vent, and a rear end of the rear seat vent extends farther back than rear ends of the floor vents.

5. The air conditioning apparatus as set forth in claim 1, wherein the mode door, the defrost vent, the main vent, the floor vents, the rear seat vent, the front opening hole, the main opening holes and the rear-end opening hole are rectangular.

6. The air conditioning apparatus as set forth in claim 1, wherein a front end of the rear-end opening hole is collinearly disposed with rear ends of the main opening holes.

7. The air conditioning apparatus as set forth in claim 1, wherein a length of the main opening holes corresponds to a length of the floor vent, and a length of the rear-end opening hole corresponds to a length of the rear seat vent.

8. The air conditioning apparatus as set forth in claim 1, wherein when the air conditioning apparatus is in a main mode, the front opening hole is blocked by an outer wall of the air conditioning housing and the rear opening hole is blocked by the separation bar so that a defrost air-conditioning operation is not conducted, the rear-end opening hole is matched with the rear seat vent so that a rear seat air-conditioning operation is conducted, the main opening hole is matched with the main vent so that a center air-conditioning operation is conducted, and a lower edge of the mode door that is adjacent to the main opening hole closes the floor vent so that a floor air-conditioning operation is not conducted.

9. The air conditioning apparatus as set forth in claim 1, wherein when the air conditioning apparatus is in a main-defrost mode, the front opening hole or the rear opening hole is matched with the defrost vent so that a defrost air-conditioning operation is conducted, the rear-end opening hole is matched with the rear seat vent so that a rear seat air-conditioning operation is conducted, a main opening hole is matched with the main vent so that a center air-conditioning operation is conducted, and a lower edge of the mode door that is adjacent to the main opening hole closes the floor vent so that a floor air-conditioning operation is not conducted.

10. The air conditioning apparatus as set forth in claim 1, wherein when the air conditioning apparatus is in a main-defrost-floor mode, the front opening hole or the rear opening hole is matched with the defrost vent so that a defrost air-conditioning operation is conducted, the rear-end opening hole is matched with the rear seat vent so that a rear seat air-conditioning operation is conducted, and the main opening hole communicates with both the main vent and the floor vent so that both a center air-conditioning operation and a floor air-conditioning operation are conducted.

11. The air conditioning apparatus as set forth in claim 1, wherein when the air conditioning apparatus is in a floor mode, the front opening hole or a front edge of the mode door is disposed over the defrost vent so that a defrost air-conditioning operation is conducted, the rear seat vent is blocked by the first portion formed between the rear opening hole and the rear-end opening hole so that a rear seat air-conditioning operation is not conducted, the main vent is blocked by a second portion formed between the rear opening hole and the main opening holes so that a center air-conditioning operation is not conducted, and the main opening holes are matched with the floor vent so that a floor air-conditioning operation is conducted.

12. The air conditioning apparatus as set forth in claim 1, wherein when the air conditioning apparatus is in a defrost-floor mode, a front edge of the mode door is disposed over the defrost vent so that a defrost air-conditioning operation is conducted, the rear seat vent is blocked by the first portion formed between the rear opening hole and the rear-end opening hole so that a rear seat air-conditioning operation is not conducted, the main vent is blocked by a second portion formed between the rear opening hole and the main opening holes so that a center air-conditioning operation is not conducted, and the main opening holes are matched with the floor vent so that a floor air-conditioning operation is conducted.

13. The air conditioning apparatus as set forth in claim 1, wherein when the air conditioning apparatus is in a defrost mode, a front edge of the mode door is disposed over the defrost vent so that a defrost air-conditioning operation is conducted, the rear seat vent is blocked by the first portion formed between the rear opening hole and the rear-end opening hole so that a rear seat air-conditioning operation is not conducted, and the main vent and the floor vent are blocked by a second portion formed between the rear opening hole and the main opening hole so that a center air-conditioning operation and a floor air-conditioning operation are not conducted.

* * * * *